B. D. THOMAS.
AIRPLANE.
APPLICATION FILED OCT. 5, 1918.
1,370,242. Patented Mar. 1, 1921.
2 SHEETS—SHEET 1.
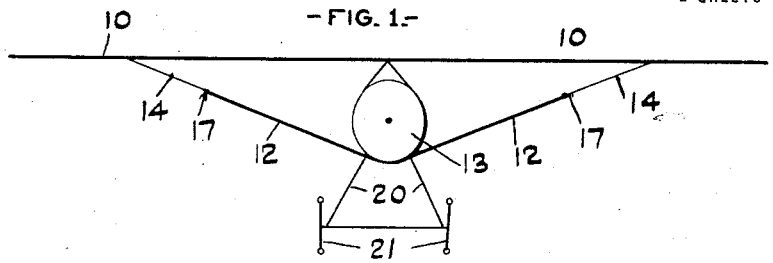
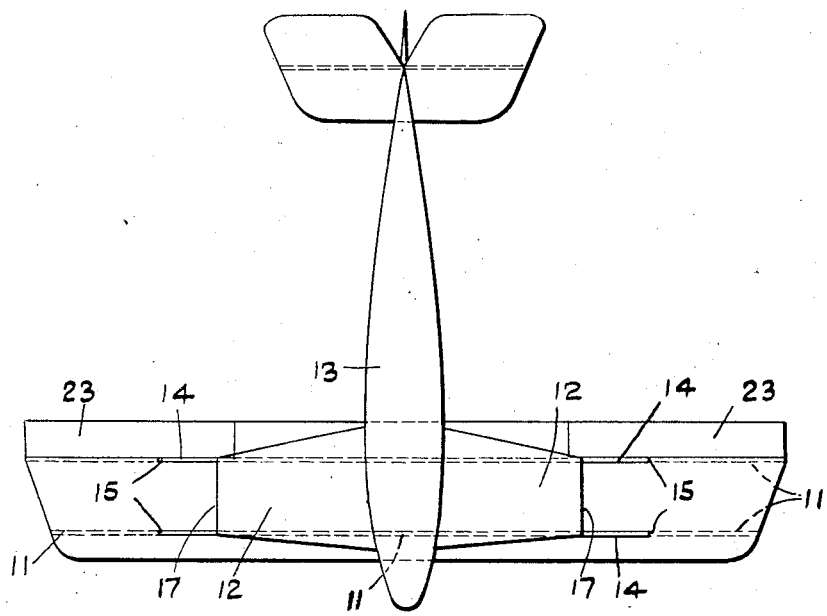
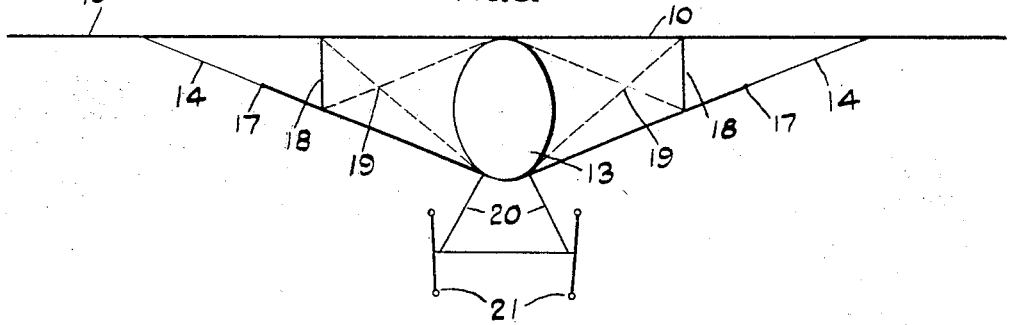
INVENTOR
Benjamin Douglas Thomas
by Edward Wright
Atty

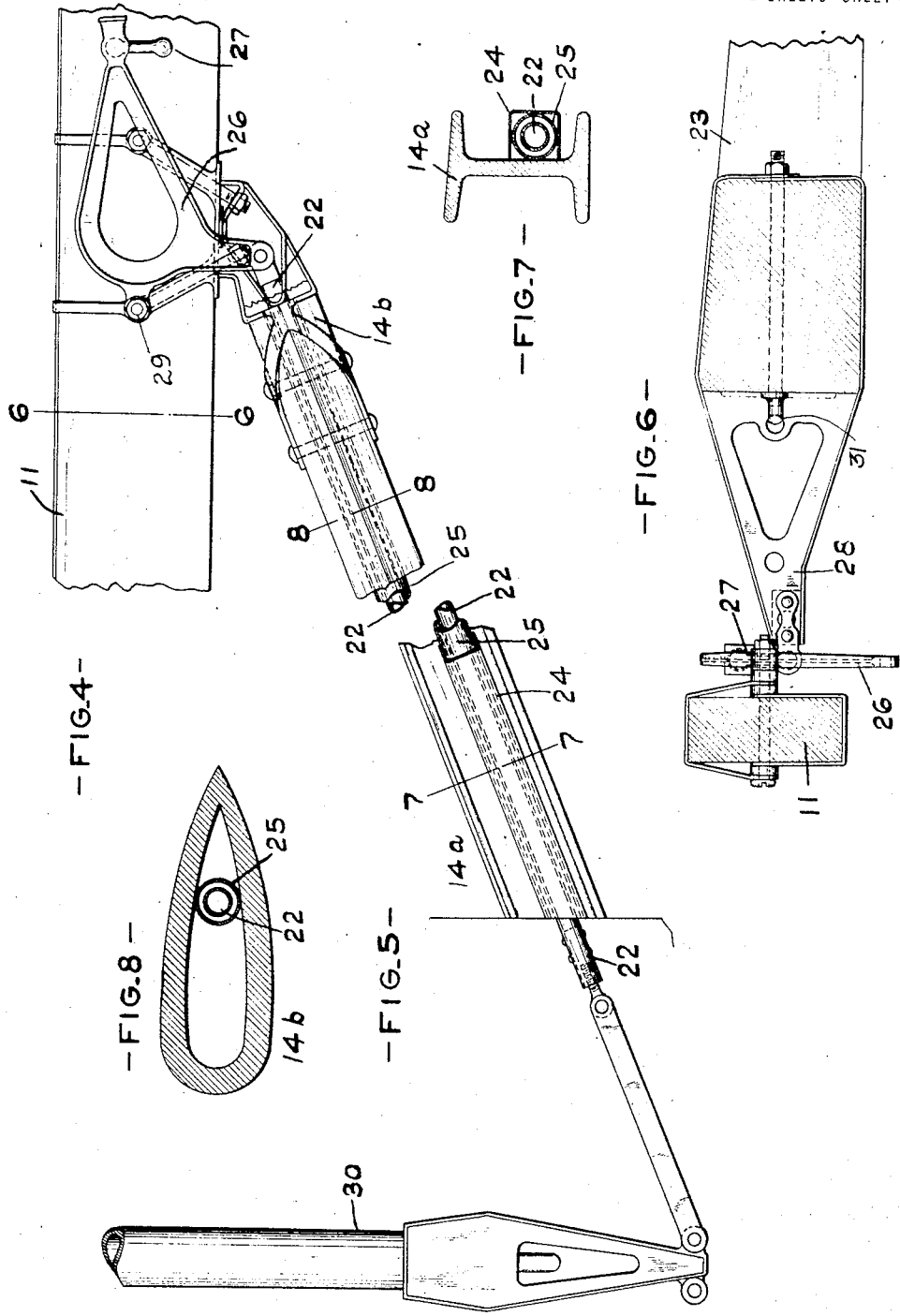

UNITED STATES PATENT OFFICE.

BENJAMIN DOUGLAS THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

AIRPLANE.

1,370,242.        Specification of Letters Patent.    Patented Mar. 1, 1921.

Application filed October 5, 1918. Serial No. 256,954.

*To all whom it may concern:*

Be it known that I, BENJAMIN DOUGLAS THOMAS, a subject of Great Britain, residing at the city of Ithaca, county of Tompkins, State of New York, U. S. A., have invented a certain new and useful Improvement in Airplanes, of which improvement the following is a specification.

This invention relates to airplanes and has for its objects to provide a simpler structure for wing bracing, to reduce the number of struts and wires as well as the length of the supporting struts and wire bracing, and thereby reduce to a minimum, the resistance to the passage of the airplane through the air. According to one of the features of my improvement, the supporting members or spars of one wing act as tension members for the support of the other wing and body when the machine is in flight, and as compression members for said support when under landing and static conditions. This result may be obtained by inclining the sections of one of the wings toward the other wing, and extending the supporting members or spars of the inclined sections to be connected with the corresponding supporting members of the other wing, thereby forming a truss effect between the body and the two wings. In the preferred construction the sections of the lower wing at opposite sides of the body are inclined upward and the supporting spars thereof are extended to and connected with the main spars of the upper wing. With this construction the lower wing spars act as tension members in flight and as compression members for supporting the upper wing in landing and for static stresses. Some or all of the intermediate struts and wire bracing are also eliminated, and those that are used may be much shorter than before so that the resistance offered by these members in the passage through the air is greatly reduced, and there is also a great saving in weight.

According to another feature of my improvement, the manually operated rods or mechanical connections employed for shifting the controlling surfaces, such as the ailerons, are located within the interior of the lower wing or its supporting members and are not, therefore, subject to the resistance of the air. This serves to further reduce the resistance surface.

In the accompanying drawings: Figure 1 is a line diagram in front elevation of an airplane embodying my improvement; Fig. 2 an inverted plan of same; Fig. 3, a view similar to Fig. 1 and showing a larger machine in which some struts and wire bracing are also used; Fig. 4, a detail view, upon a larger scale, showing one form of connection between the main spars of the lower wing and the upper wing; Fig. 5, a similar detail view, showing the lower portion of the spars and the manually operated connection for shifting the ailerons; Fig. 6, a view at right angles to Fig. 4, and showing parts in section on the line 6—6; Fig. 7, a transverse section of the lower wing spar taken on the line 7—7 of Fig. 5; and Fig. 8, a similar section taken on the line 8—8 of Fig. 4.

According to the design shown the upper wing 10, of the airplane is provided with the usual supporting beams or spars 11, extending lengthwise of the wing, but the lower wing sections 12, instead of being substantially parallel to the upper wing, are inclined upward at an angle from the body 13, and the supporting spars 14, of the lower wing sections are extended to and connected with the upper wing spars 11, at the points 15. The lower wing surface 12 may not extend all the way to the upper wing but preferably terminates at an intermediate point 17.

The body 13, may be of the usual well known construction, and with its bracing forms a strut member between the upper and lower wings, so that with my improved construction, a perfect truss effect is produced between the upper and lower wing spars and the body, in which lower wing spars 14, act as tension members during flight, and as compression members under landing and static conditions.

For the smaller types of airplanes such as shown in Figs. 1 and 2, no additional struts or wire bracing is necessary but in the larger machines, an intermediate strut 18, and diagonal wire bracing 19, may be employed, as indicated in Fig. 3. But even where intermediate bracing is used it will be noted that these members are shorter than those heretofore used and consequently a reduced surface is exposed for resistance to passage through the air.

As an additional means for supporting the upper plane or wing when in flight, lift wires may be inserted between the body and the points 15 of the upper wing spars, the wires being entirely inclosed within the lower wing structure so as to avoid any additional resistance surface.

The land chassis 20, and landing wheels 21, may be of the usual construction.

According to another feature of my improvement, the mechanical connection, such as the push and pull rod 22, for operating the lateral controlling surfaces, or ailerons 23, is located within the lower wing structure, being preferably carried along the lower wing spar. The lower end portion of this wing beam or spar may be shaped similar to an I-section 14$^a$, as indicated in Figs. 5 and 7, in which case the aileron operating tube or rod 22, is placed along the side of the spar between the flanges and inclosed within a tube box 24, and a tube casing 25. The extended portion of the lower wing spar which is joined to the upper wing spar may be of a different shape as indicated at 14$^b$, in Figs. 4 and 8, in which instance the spar is made hollow and the aileron operating rod or tube 22, extends through the hollow portion. The wing spars may be fastened together by any suitable form of connections, such as the terminating clip and straps shown particularly in Fig. 4.

Any suitable form of mechanical connection may also be employed for transmitting the movement from the push and pull rod 22 to the aileron, as for instance, the bell crank 26, pivoted on the upper wing spar at 29, and having one arm pivoted to the end of rod 22, and the other arm carrying a link 27, which may be pivotally connected with the king-post 28 of the aileron 23, as shown more particularly in Figs. 4 and 6. The ailerons may be hinged to the frame of the upper wing by the eye bolts, 31, in the usual way. The lower end of the aileron operating tube or rod 22, may be attached to the control lever 30, as indicated in Fig. 5. By this means, a very simple, direct and positive connection is made and thé ailerons may be readily shifted as desired. The operating connections are also inclosed and not exposed to cause resistance to the passage through the air.

It will now be seen that by means of my improvement there is a considerable saving in weight by the elimination of some parts and the shortening of others whereby it is possible to obtain a much lighter structure of equal strength; and also that the resistance to the passage through the air is reduced to a minimum, both by reason of the reduction in the number and length of the bracing parts and also by the location of the control connections within the wing structure.

Having now described my invention what I claim as new and desire to secure by Letters Patent is:

1. In an airplane, the combination of a body, a substantially horizontal upper wing with supporting spars, and a lower wing shorter than the upper wing, inclined upward at either side of the body and having substantially straight spars extending beyond the lower wing surface to the upper wing spars.

2. In an airplane, the combination of a body, a substantially horizontal upper wing with supporting spars, a shorter lower wing formed in sections inclined upward from either side of the body and having substantially straight spars extending to and directly connected with the spars of the upper wing, the lower wing surface extending only part away from the body toward the upper wing.

3. In an airplane, the combination of upper and lower wings having supporting spars, the lower wing being inclined upward and having its spars extended directly to the spars of the upper wing, ailerons connected to the upper wing, and connecting means inclosed within the lower wing structure for operating said ailerons.

4. In an airplane, the combination of upper and lower wings having supporting spars, the lower wing being inclined upward and having its spars extended directly to the spars of the upper wing, ailerons connected to the upper wing, and a push and pull rod inclosed within the lower wing structure and extending to the upper wing for operating said ailerons.

5. In an airplane, the combination of a body, an upper wing having supporting spars, ailerons connected to said upper wing, a shorter lower wing formed in sections inclined upward from either side of the body and having spars extending to the spars of the upper wing, and a rod carried along the lower wing spar from the body to the upper wing for operating the aileron.

6. In an airplane, the combination of a body, an upper wing having supporting spars, ailerons connected to said upper wing, a shorter lower wing formed in sections inclined upward from either side of the body and having spars extending to the spars of the upper wing, a lever pivotally mounted on one of the upper spars and connected to the aileron, and an operating rod carried along the lower wing spar and connected to said lever.

In testimony whereof I have hereunto set my hand.

B. DOUGLAS THOMAS,